United States Patent [19]

Ueda et al.

[11] Patent Number: 5,173,773
[45] Date of Patent: Dec. 22, 1992

[54] MOVING PICTURE SIGNAL PROGRESSIVE CODING SYSTEM

[75] Inventors: Motoharu Ueda; Takami Niihara, both of Yokosuka, Japan

[73] Assignee: Victor Company of Japan, Ltd., Yokohama, Japan

[21] Appl. No.: 789,202

[22] Filed: Nov. 8, 1991

[30] Foreign Application Priority Data

Nov. 9, 1990 [JP] Japan ................................. 2-305527

[51] Int. Cl.$^5$ ..................... H04N 7/133; H04N 7/137; H04N 11/04
[52] U.S. Cl. ..................................... 358/136; 358/13; 358/105; 358/135
[58] Field of Search ............... 358/133, 135, 136, 105, 358/13

[56] References Cited

U.S. PATENT DOCUMENTS

| | | | |
|---|---|---|---|
| 4,733,297 | 3/1988 | Katsumata | 358/105 |
| 4,891,699 | 1/1990 | Hamada | 358/105 |
| 5,028,995 | 7/1991 | Izawa | 358/136 |

OTHER PUBLICATIONS

Moving Vector Detecting Circuit Sep. 06, 1990 Takami Niihara, abstract JP-2-224490 (A).
Adaptive Inter-Frame Prediction Encoding System Apr. 27, 1989 Kenji Sugiyama, abstract JP-2-285816 (A).
Picture Encoder Jul. 04, 1988 Hisashi Ibaraki, abstract JP-2-16887 (A).
Inter-Frame Predictive Coding System Jan. 20, 1989 Kenji Sugiyama, abstract JP-2-192378 (A).

Primary Examiner—Howard W. Britton
Attorney, Agent, or Firm—Jacobson, Price, Holman & Stern

[57] ABSTRACT

A progressive coding system wherein a moving picture signal is separated into a low frequency component of a little luminance variation and a high frequency component of much luminance variation, and the components are respectively coded by motion compensated predictive coding. The high frequency component is motion-compensated according to a motion quantity of the low frequency component. The motion quantity is modified by a sampling ratio of the moving picture signal and low frequency component. The motion quantity can be detected based on the low frequency component in a present frame and those subjected to intraframe coding in previous and subsequent intraframes to the present frame. A predictve low frequency component is then obtained by motion compensation using the motion quantity according to time intervals of the low frequency components between the frames. A predictive high frequency component is also obtained like the predictive low frequency component referring to the time interval. A motion quantity of the moving picture signal is obtained for motion-compensating the low and high frequency components.

3 Claims, 4 Drawing Sheets

PREVIOUS INTRAFRAME    SUBSEQUENT INTRAFRAME

MOVING PICTURE SIGNAL PROGRESSIVE CODING SYSTEM

BACKGROUND OF THE INVENTION

The present invention relates to a picture signal coding system for compressing a moving picture signal by progressive coding.

The progressive coding is a method for compressing a picture signal by respectively coding a low frequency component of a little luminance variation and a high frequency component of much luminance variation, both separated from the picture signal. A picture of low resolution is reproduced by decoding the low frequency component thus coded and a picture of high resolution is reproduced by decoding both the low and high frequency components thus coded.

The following is well known in the progressing coding of a moving picture signal. A moving picture signal of an original moving picture is first sub-sampled to produce a low frequency component of a little luminance variation in a present frame. A motion quantity (motion vector) on a decoded low frequency component in a previous frame and the low frequency component is detected.

Motion compensation is conducted using the motion vector to produce a predictive low frequency component. The predictive low frequency component is subtracted from the low frequency component to obtain a predictive error. The predictive error is then subjected to the orthogonal transform and quantization. Quantized transform coefficients and motion vector are then subjected to variable length coding such as the Huffman coding to code the low frequency component.

The quantized transform coefficients and motion vector are further subjected to the inverse orthogonal transform and de-quantization to decode the low frequency component thus coded. The low frequency component thus decoded is over-sampled to produce an over-sampled decoded low frequency component. The over-sampled decoded low frequency component is subtracted from the moving picture signal of the original moving picture to produce a high frequency component of much luminance variation. A motion vector on a decoded high frequency component in a previous frame and the high frequency component in a present frame is detected.

Motion compensation is conducted using the motion vector to produce a predictive high frequency component. The predictive high frequency component is subtracted from the high frequency component to obtain a predictive error. The predictive error is then subjected to the orthogonal transform and quantization. Quantized transform coefficients and motion vector are subjected to variable length coding such as the Huffman coding to code the high frequency component.

A moving picture of low resolution is obtained by decoding the coded low frequency component and the original moving picture is obtained by adding the decoded high frequency component and over-sampled decoded low frequency component.

The above mentioned method has the following disadvantages. A quantization error is produced when the low frequency component is coded and is then coded with the high frequency component. This leads to motion vector detection of low precision on the high frequency component.

Furthermore, motion vectors are respectively detected on the low and high frequency components. This results in the predictive low and high frequency components with no correlation therebetween. Accordingly, when monitored as moving pictures, the low and high frequency components seem to show different actions.

Moreover, both the motion vectors on the low and high frequency components also should be processed in a coding system. This results in an increase in the amount of data to be coded.

There are still further disadvantages. Backward reproduction is sometimes required when magnetic tapes and optical discs are used for example. In this case, the above mentioned progressive coding with the prediction using data in a previous frame cannot conduct decoding because a predictive signal for the decoding cannot be obtained.

Moreover, in communication networks, it sometimes happens that coded data only for a low frequency component is transmitted through limited transmission lines without the following coded data for a high frequency component.

SUMMARY OF THE INVENTION

An object of the invention is to provide a progressive coding system for coding a moving picture signal wherein the amount of data to be coded on a high frequency component is highly decreased.

According to the present invention there is provided a progressive coding system wherein a moving picture signal is separated into a low frequency component of a little luminance variation and a high frequency component of much luminance variation, and the components are respectively coded by motion compensated predictive coding, comprises motion quantity modification means for modifying a motion quantity of the low frequency component according to a sampling ratio of the moving picture signal and low frequency component and motion compensation means for motion-compensating the high frequency component according to the motion quantity thus modified.

There is also provided a progressive coding system wherein a moving picture signal in a present frame is separated into a low frequency component of a little luminance variation in the present frame and a high frequency component of much luminance variation in the present frame, and the components are respectively coded by motion compensated predictive coding, comprises motion detection means for respectively detecting motion quantities on the low frequency component in the present frame and low frequency components in previous and subsequent intraframes to the present frame, first motion compensation means for respectively motion-compensating the low frequency components in the previous and subsequent intraframes according to the respective motion quantities to produce first and second pre-predictive low frequency components, weighting the pre-predictive low frequency components according to time intervals between the frames thereof to add the pre-predictive low frequency components thus weighted to each other, thus producing a third pre-predictive low frequency component, selecting one of the first, second and third pre-predictive low frequency components, of the least predictive error, as a predictive low frequency component for the motion compensated predictive coding and outputting a selection signal indicating which is selected among the first, second and third pre-predictive low frequency components, motion quantity modification means for respectively modifying the motion quantities according to a sampling ratio of the moving picture signal and low frequency component, and second motion compensation means responsive to the selection signal for producing a predictive high frequency component on the basis of the modified motion quantities and the high frequency component of either the previous or subsequent intraframe or both the intraframes in a manner identical to that in which the selected one of the first, second and third pre-predictive low frequency components is produced.

There is further provided a progressive coding system wherein a moving picture signal is separated into a low frequency component of a little luminance variation and a high frequency component of much luminance variation, and the components are respectively coded by motion compensated predictive coding, comprises motion quantity modification means for modifying a motion quantity of the moving picture signal according to a sampling ratio of the moving picture signal and low frequency component, first motion compensation means for motion-compensating the low frequency component according to the motion quantity thus modified and second motion compensation means for motion-compensating the high frequency component according to the motion quantity thus modified.

The other objects and features of this invention will become understood from the following description with reference to the accompanying drawings.

DETAILED DESCRIPTION OF PREFERRED EMBODIMENTS

Figure 1:
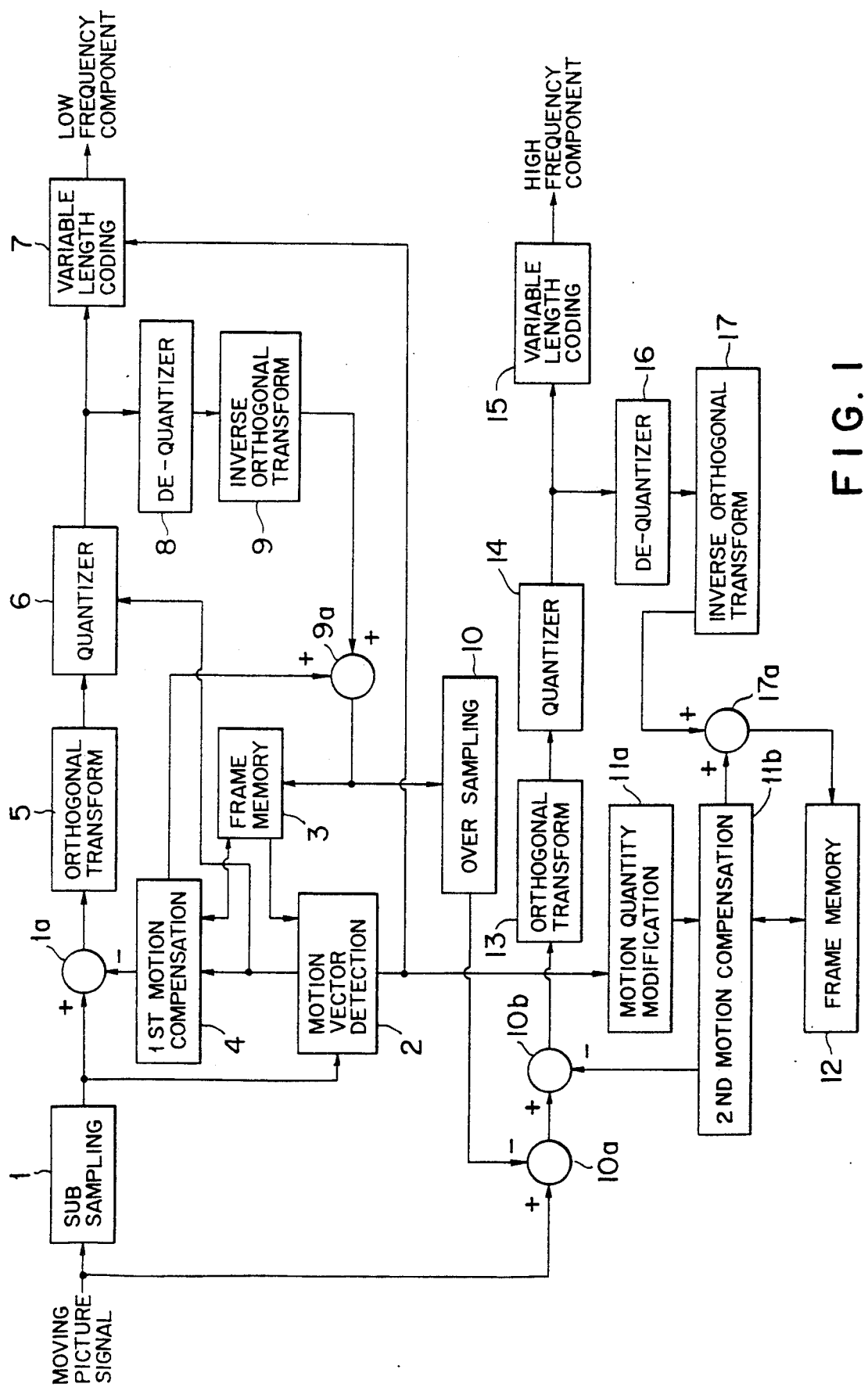
FIG. 1 is a block diagram showing a preferred embodiment of a moving picture signal progressive coding system according to the present invention.

A preferred embodiment of the coding system according to the present invention is shown in FIG. 1. The incoming original moving picture signal is subjected to a sub sampling circuit 1 which produces a low frequency component of a little luminance variation in a present frame. The low frequency component is applied to a motion vector detection circuit 2 which detects a motion vector on a decoded low frequency component in a previous frame stored in a frame memory 3 and the low frequency component in the present frame. The motion vector can be detected by such as block matching.

The motion vector is supplied to a first motion compensation circuit 4. Also supplied to the circuit 4 is the decoded low frequency component from the frame memory 3. Motion compensation is conducted using the motion vector in the circuit 4 to produce a predictive low frequency component.

The predictive low frequency component is subtracted, in a subtractor 1a, from the low frequency component sent from the sub sampling circuit 1 to produce a predictive error. The predictive error is divided into blocks of a plurality of pixels in an orthogonal transformer 5 which produces transform coefficients by orthogonal transform such as DCT (Discrete Cosine Transform). The transform coefficients and motion vector are then quantized by a quantizer 6.

The transform coefficients and motion vector thus quantized are subjected to a variable length coding circuit 7 which effectively codes the low frequency component with reduction of the amount of data by such as the Huffman coding.

The transform coefficients and motion vector thus quantized from the quantizer 6 are de-quantized by a de-quantizer 8 and subjected to inverse orthogonal transform such as IDCT (Inverse Discrete Cosine Transform) by an inverse orthogonal transformer 9 to produce a decoded predictive error. The decoded predictive error is added by an adder 9a to the predictive low frequency component sent from the first motion compensation circuit 4 to produce the decoded low frequency component which is then stored in the frame memory 3.

The decoded low frequency component is over-sampled by an over sampling circuit 10 to produce an over-sampled decoded low frequency component. The over-sampled decoded low frequency component is subtracted from the incoming original moving picture signal by a subtractor 10a to produce a high frequency component of much luminance variation.

The motion vector on the low frequency component detected by the first motion vector detection circuit 2 is modified according to a sampling ratio of the original moving picture and the low frequency component by a motion quantity modification circuit 11a. The motion vector thus modified is supplied to a second motion compensation circuit 11b. Also supplied to the circuit 11b is a decoded high frequency component stored in a frame memory 12. Motion compensation is conducted using the motion vector thus modified in the circuit 11b to produce a predictive high frequency component.

The motion vector thus modified on the high frequency component is expressed by $$MV_L = (MV_{LX}, MV_{LY})$$
$$= (MV_{SX} \times n_x, MV_{SY} \times n_y)$$

where, $MV_L$ is the motion vector thus modified and $MV_S$ is the motion vector of the low frequency component given by $MV_S = (MV_{sx}, MV_{sy})$ and the sampling ratio of the incoming moving picture signal and the low frequency component is given by $1:n_x$ and $1:n_y$ in horizontal and vertical directions, respectively.

The predictive high frequency component is subtracted from the high frequency component sent from the subtractor 10a by a subtractor 10b to produce an predictive error. The predictive error is divided into a plurality of blocks in an orthogonal transformer 13 which produces transform coefficients. The transform coefficients are quantized by a quantizer 14 and are subjected to a variable length coding circuit 15 which effectively codes the high frequency component by reducing the amount of data by variable length coding such as the Huffman coding. The transform coefficients thus quantized from the quantizer 14 is de-quantized by a de-quantizer 16 and is subjected to an inverse orthogonal transformer 17 which produces a decoded predictive error by inverse orthogonal transform such as IDCT (Inverse Discrete Cosine Transform). The decoded predictive error is added by an adder 17a to the predictive high frequency component sent from the second motion compensation circuit 11b to produce the decoded high frequency component which is then stored in the frame memory 12.

When decoding, a moving picture of low resolution can be reproduced by decoding the low frequency component thus coded. The moving picture of low resolution and that of a high resolution can be reproduced by decoding both the low and high frequency components thus coded. Further, the original moving picture can be reproduced by adding the over-sampled decoded low frequency component and the decoded high frequency component to each other. A decoding system has local decoding sections respectively with respect to the moving pictures of low and high resolutions and which description is omitted. According to the coding described above, the same motion vector is used for both the low and high frequency components, so that the predictive low and high frequency components have a correlation therebetween. This results in the amount of data to be coded for the high frequency component being decreased and the resolution of the moving picture being improved.

A quantization error produced when the low frequency component is coded is motion-compensated by means of the predictive high frequency component including components which compensate the quantization error, so that resolution of a reproduced picture is improved.

Figure 4A:
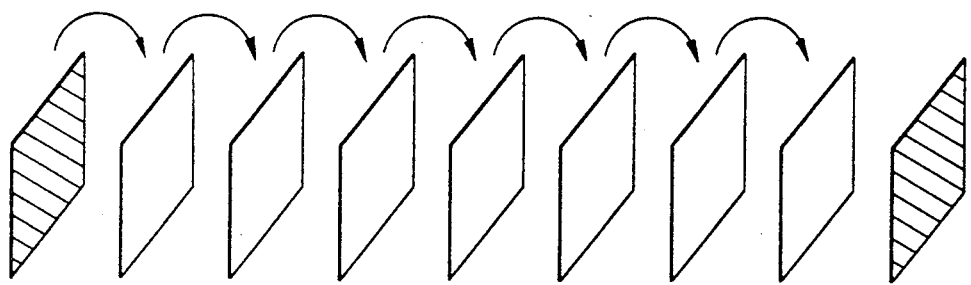
FIG. 4A is a view for explaining recursive-type interframe coding by the system shown in FIG. 1.
Figure 4B:
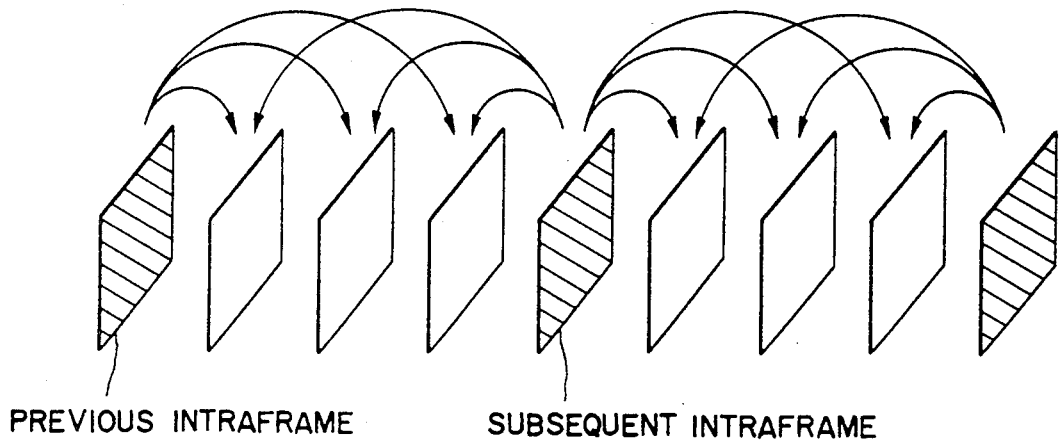
FIG. 4B is a view for explaining adaptive previous and subsequent predictive interframe coding by the system shown in FIG. 2.

The embodiment described above is an example of recursive-type interframe coding as shown in FIG. 4A, while the following is an example of adaptive previous and subsequent predictive interframe coding as shown in FIG. 4B, low and high frequency components being periodically coded by intraframe coding.

Figure 2:
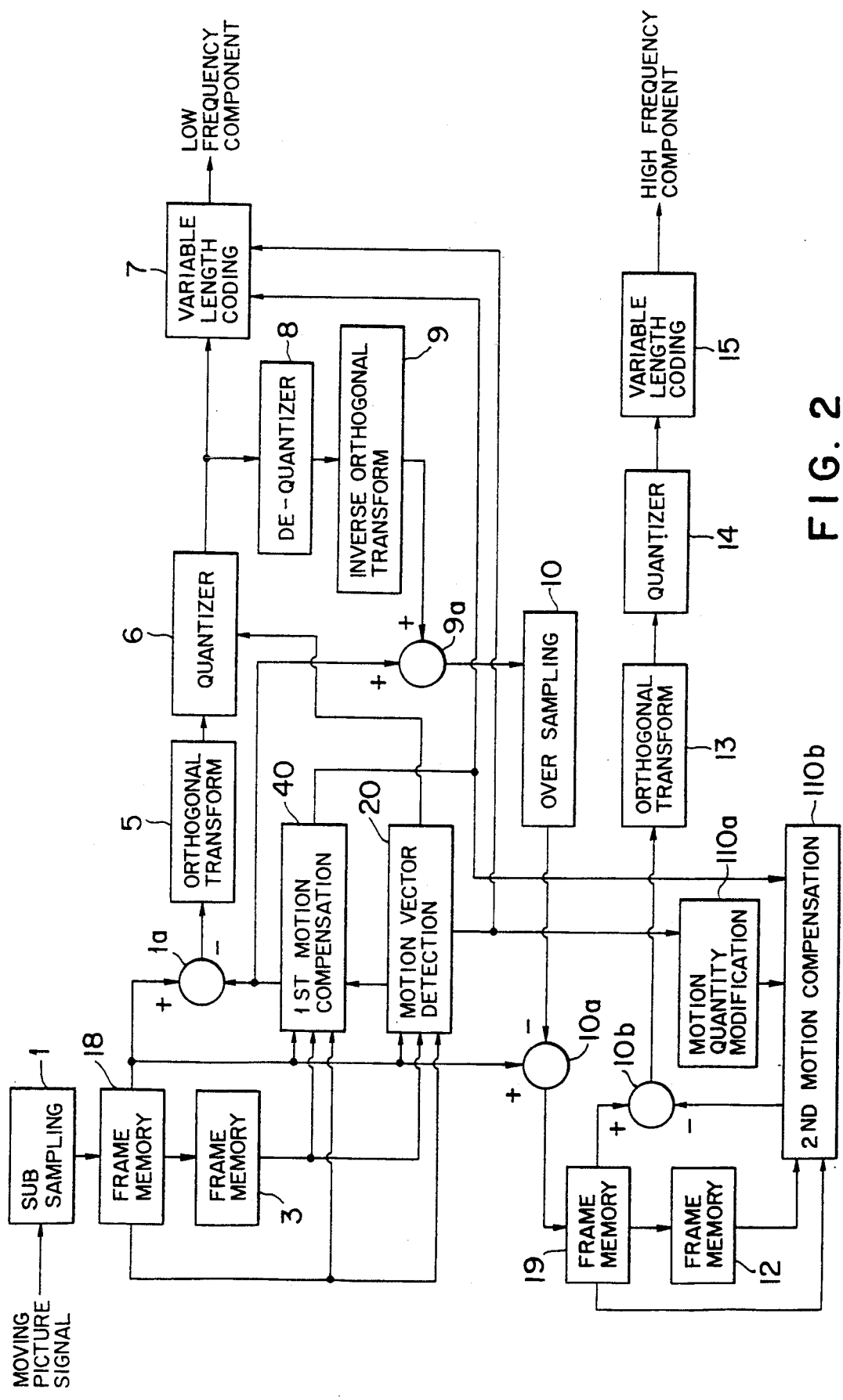
FIG. 2 is a block diagram showing another preferred embodiment of the system according to the present invention.

In FIG. 2 which shows another preferred embodiment according to the present invention, the sub sampling circuit 1, orthogonal transformers 5 and 13, quantizers 6 and 14, variable length coding circuits 7 and 15, de-quantizer 8, inverse orthogonal transformer 9 and over sampling circuit 10 respectively function the same as those in FIG. 1.

Stored in frame memories 3 and 12 respectively are low and high frequency components to be intraframe-coded in a previous frame and a subsequent frame to a present frame, while stored in frame memories 18 and 19 respectively are low and high frequency components to be interframe-coded in a plurality of frames. The block diagram shown in FIG. 2 is a non-recursive type so that either decoded frequency components or uncoded frequency components can be stored in those frame memories.

In this embodiment, the uncoded low and high frequency components are used.

On the low frequency component, a motion vector detection circuit 20 detects motion vectors respectively between the present frame and the previous intraframe and between the present frame and the subsequent intraframe being stored in the frame memories 3 and 18, respectively.

In a first motion compensation circuit 40, first and second pre-predictive low frequency components $X_f$ and $X_b$ are produced on the basis of the previous and subsequent intraframes respectively using the motion vectors detected by the detection circuit 20.

Figure 5:
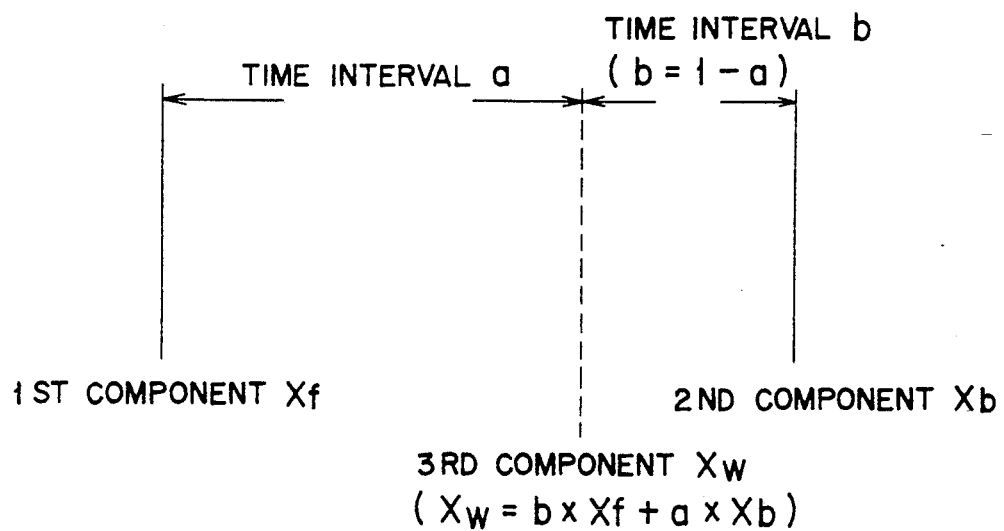
FIG. 5 is a view for explaining calculation of a motion-compensated previous and subsequent interpolation predicted value.

As shown in FIG. 5, the first and second components $X_f$ and $X_b$ are weighted according to time intervals between the present frame and the previous and subsequent intraframes respectively. The first and second components $X_f$ and $X_b$ thus weighted are added to each other to produce a third pre-predictive low frequency component $X_w$. One of the three components $X_f$, $X_b$ and $X_w$ is selected which has the least predictive error, as a predictive low frequency component to be supplied to an adder 1a for the coding. The first motion compensation circuit 40 also produces a selection signal indicating which components among the three components $X_f$, $X_b$ and $X_w$ is selected.

The motion vectors on the low frequency component are modified by a motion quantity modification circuit 110a according to a sampling ratio of the incoming moving picture signal and the low frequency component.

In a second motion compensation circuit 110b, a predictive high frequency component is produced on the basis of the motion vectors thus modified and high frequency components of the previous or the subsequent intra frame or the both stored in the frame memory 19. From which intra frame the predictive high frequency component is produced is the same as the predictive low frequency component, that is, it depends on the selection signal produced by the first motion compensation circuit.

As mentioned above, the uncoded high frequency components are used for the motion compensation, so that a de-quantizer and an inverse orthogonal transformer are not required for coding the high frequency component.

This results in the amount of data to be coded for the high frequency component being decreased and the resolution of the moving picture being improved.

Furthermore, owing to the low and high frequency components coded by intraframe coding, bckward reproduction can be done even if the low and high frequency components are stored in such as magnetic tapes and optical discs.

In communication networks, conventionally it sometimes happens that data for a low frequency component only transmitted due to a transmission capacity, however in this embodiment, a high frequency component is correctly decoded in a moving picture signal following to an intraframe coded moving picture signal.

Prediction is made by means of moving picture signals in previous and subsequent frames in this embodiment, so that prediction efficiency is improved and the coding system in the embodiment functions well even in the case of scene change.

Figure 3:
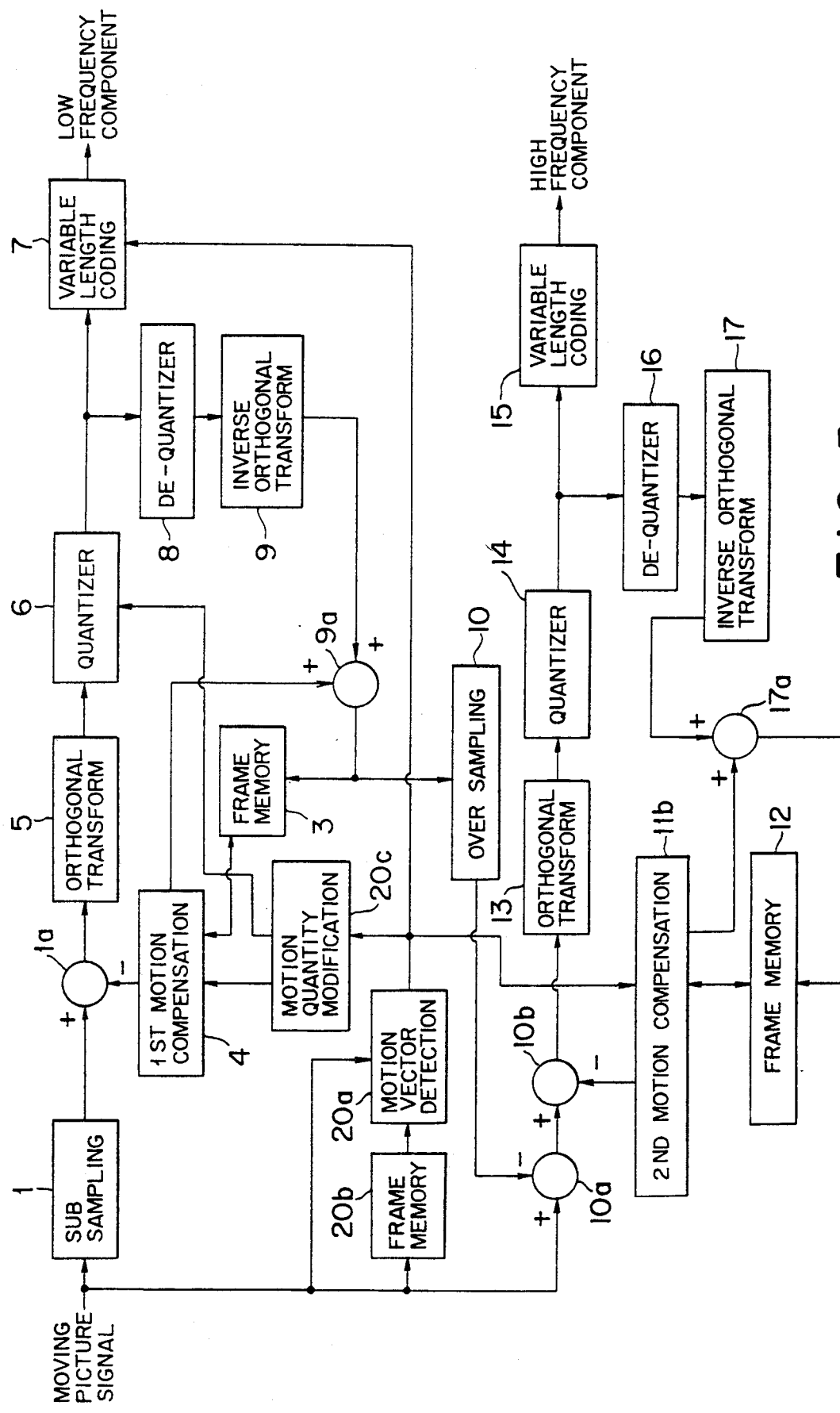
FIG. 3 is a block diagram showing a further preferred embodiment of the system according to the present invention.

FIG. 3 shows a further preferred embodiment of the coding system according to the present invention. In this embodiment, a motion vector of an incoming original moving picture signal stored in a frame memory 20b is detected by a motion vector detection circuit 20a.

The motion vector is modified according to a sampling ratio of the incoming moving picture signal and a low frequency component by a motion quantity modification circuit 20c. The motion vector thus modified is supplied to first and second motion compensation circuits 4 and 11b respectively for motion-compensated coding of low and high frequency components. The motion-compensated coding is conducted in the same manner as explained referring to FIG. 1.

The progressive coding systems described above through the three embodiments extract one low frequency component from an original moving picture signal per frame. However, not limited to the embodiments, any number of low frequency components of different levels of luminance variation may be extracted per frame.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A progressive coding system wherein a moving picture signal is separated into a low frequency component of a little luminance variation and a high frequency component of much luminance variation, and the components are respectively coded by motion compensated predictive coding, the system comprising:
   motion quantity modification means for modifying a motion quantity of the low frequency component according to a sampling ratio of the moving picture signal and low frequency component; and
   motion compensation means for motion-compensating the high frequency component according to the motion quantity thus modified.

2. A progressive coding system wherein a moving picture signal in a present frame is separated into a low frequency component or a little luminance variation in the present frame and a high frequency component of much luminance variation in the present frame, and the components are respectively coded by motion compensated predictive coding, the system comprising:
   motion detection means for respectively detecting motion quantities on the low frequency component in the present frame and low frequency components in previous and subsequent intraframes to the present frame;
   compensation means for respectively motion-compensating the low frequency components in the previous and subsequent intraframes according to the respective motion quantities to produce first and second pre-predictive low frequency components, weighting the pre-predictive low frequency components according to time intervals between the frames thereof to add the pre-predictive low frequency components thus weighted to each other, thus producing a third pre-predictive low frequency component, selecting one of the first, second and third pre-predictive low frequency components, of the least predictive error, as a predictive low frequency component for the motion compensated predictive coding and outputting a selection signal indicating which is selected among the first, second and third pre-predictive low frequency components;
   motion quantity modification means for respectively modifying the motion quantities according to a sampling ratio of the moving picture signal and low frequency component; and
   second motion compensation means responsive to the selection signal for producing a predictive high frequency component on the basis of the modified motion quantities and the high frequency component of either the previous or subsequent intraframe or both the intraframes in a manner identical to that in which the selected one of the first, second and third pre-predictive low frequency components is produced.

3. A progressive coding system wherein a moving picture signal is divided into a low frequency component of a little luminance variation and a high frequency component of much luminance variation, and the components are respectively coded by motion compensated predictive coding, the system comprising:
   motion quantity modification means for modifying a motion quantity of the moving picture signal according to a sampling ratio of the moving picture signal and low frequency component;
   first motion compensation means for motion-compensating the low frequency component according to the motion quantity thus modified; and
   second motion compensation means for motion-compensating the high frequency component according to the motion quantity thus modified.

* * * * *